US012590661B2

(12) United States Patent
Duan

(10) Patent No.: US 12,590,661 B2
(45) Date of Patent: Mar. 31, 2026

(54) QUICK COUPLER STRUCTURE

(71) Applicant: **ASIA VITAL COMPONENTS CO.,
LTD.**, New Taipei City (TW)

(72) Inventor: Qiang-Fei Duan, New Taipei City
(TW)

(73) Assignee: **ASIA VITAL COMPONENTS CO.,
LTD.**, New Taipei City (TW)

( * ) Notice: Subject to any disclaimer, the term of this
patent is extended or adjusted under 35
U.S.C. 154(b) by 7 days.

(21) Appl. No.: 18/241,988

(22) Filed: Sep. 4, 2023

(65) Prior Publication Data

US 2025/0075835 A1     Mar. 6, 2025

(51) Int. Cl.
*F16L 37/34*          (2006.01)

(52) U.S. Cl.
CPC ................................... *F16L 37/34* (2013.01)

(58) Field of Classification Search
CPC .......... F16L 37/35; F16L 37/367; F16L 37/34
USPC ............. 251/149, 149.1, 149.5, 149.6, 149.7
See application file for complete search history.

(56) References Cited

U.S. PATENT DOCUMENTS

| | | | | | |
|---|---|---|---|---|---|
| 2,456,045 | A | * | 12/1948 | Brock ...................... | F16L 29/04 |
| | | | | | 137/614.03 |
| 3,809,122 | A | | 5/1974 | Chalmers | |
| 5,211,197 | A | * | 5/1993 | Marrison ................ | F16L 37/35 |
| | | | | | 251/149.6 |

| | | | | | |
|---|---|---|---|---|---|
| 5,447,177 | A | * | 9/1995 | Ricken .................... | F16L 37/35 |
| | | | | | 137/614.04 |
| 6,158,717 | A | | 12/2000 | Van Scyoc et al. | |
| 6,681,803 | B2 | * | 1/2004 | Taneya ................... | F16L 37/23 |
| | | | | | 251/149.6 |

(Continued)

FOREIGN PATENT DOCUMENTS

| | | |
|---|---|---|
| CN | 110206953 B | 5/1974 |
| CN | 202171081 U | 3/2012 |

(Continued)

OTHER PUBLICATIONS

Search Report dated May 18, 2024 issued by Taiwan Intellectual
Property Office for counterpart application No. 112129135.

(Continued)

*Primary Examiner* — Kenneth Rinehart
*Assistant Examiner* — Jonathan J Waddy
(74) *Attorney, Agent, or Firm* — Demian K. Jackson;
Jackson IPG PLLC

(57)          ABSTRACT

A quick coupler structure includes a male and a female
coupler. The male coupler internally receives a fixed valve
core surrounded by a spring and a connecting tube for
connecting to a coupling platform at an upper part of the
female coupler. The connecting tube is externally provided
with sealing members to enhance airtight connection with
the male coupler. The coupling platform defines a central
thru-hole with a movable valve received therein to normally
close it. When the fixed valve core is caused to expose from
the connecting tube, it pushes the movable valve out of the
central thru-hole to open the latter, allowing the male and the
female coupler to communicate with each other. The sealing
member won't be turned or loosened by a shearing force
when the male and the female coupler are assembled or
disassembled, giving the quick coupler structure upgraded
air-tightness, pressure resistance and coupling reliability.

9 Claims, 6 Drawing Sheets

(56) References Cited

U.S. PATENT DOCUMENTS

| | | | |
|---|---|---|---|
| 2002/0148514 A1 | 10/2002 | Taneya et al. | |
| 2013/0186495 A1 * | 7/2013 | Abura | F16L 37/28 |
| | | | 137/798 |
| 2013/0320668 A1 * | 12/2013 | Cheon | F16L 37/23 |
| | | | 285/148.1 |
| 2017/0184242 A1 * | 6/2017 | Tiberghien | F16L 37/35 |
| 2022/0136634 A1 * | 5/2022 | Gong | H05K 7/20327 |
| | | | 361/679.53 |
| 2025/0075835 A1 | 3/2025 | Duan | |

FOREIGN PATENT DOCUMENTS

| | | | | | |
|---|---|---|---|---|---|
| CN | 110500463 | A | 11/2019 | | |
| CN | 213393955 | U | 6/2021 | | |
| CN | 220396853 | U | 1/2024 | | |
| EP | 0086130 | B1 | 5/1988 | | |
| EP | 2505895 | A1 * | 10/2012 | | F16L 29/04 |
| EP | 3191759 | B1 | 6/2018 | | |
| TW | M648985 | U | 12/2023 | | |
| WO | WO-2012093656 | A1 * | 7/2012 | | F16L 37/35 |

OTHER PUBLICATIONS

Search Report dated May 26, 2025, issued by China National Intellectual Property Administration for counterpart patent application No. 202310965700.3.

* cited by examiner

1

QUICK COUPLER STRUCTURE

FIELD OF THE INVENTION

The present invention relates to a quick coupler structure, and more particularly, to a quick coupler structure that can be conveniently processed and assembled and provides high air-tightness and coupling reliability.

BACKGROUND OF THE INVENTION

In the currently available gas supply system or liquid cooling system, pipes and couplers are usually used to connect different modular units to one another. The modular units have to be disconnected and connected again frequently during the use and maintenance thereof. Gas or liquid flowing through the pipes tends to leak when the pipes are disconnected frequently to adversely affect the working environment and the stability of the system. To avoid this problem, a quick disconnect coupler (QDC) enabling quickly disconnection and one-way sealing is necessary for use in the system. Usually, the QDC has a female coupler connected to the fixed module and a male coupler connected at an end to the pipe and at another end to the female coupler, so as to enable secured connection or disconnection of the pipes in the system.

Please refer to FIG. 4. A prior art male and female coupler connection structure includes a one-way male coupler 4 inserted into a one-way female coupler 5. The one-way male coupler 4 includes a male housing 41, a movable valve 42, and a spring 43. The male housing 41 consists of a front section 411 and a rear section 412. An end of the male housing 41 is a plugging end 413, and another end of the male housing is a male connection end 414. The male housing 41 internally defines a male coupler fluid passage and the spring 43 is received therein. The movable valve 42 is fitted in the male coupler fluid passage corresponding to an opening of the plugging end 413, and a sealing ring 44 is circumferentially fitted on around the movable valve 42. The one-way female coupler 5 includes a female housing 51, a fixed valve 52, and a spring 53. The female housing 51 consists of a front section 511 and a rear section 512. An end of the female housing 51 is a receiving end 513 and another end of the female housing 51 is a female connection end 514. The female housing 51 internally defines a female coupler fluid passage and the spring 53 is received therein. The fixed valve 52 is fitted in the female coupler fluid passage to axially abut against the movable valve 42. An annular gap is formed between an outer surface of the fixed valve 52 and an inner wall of the female housing 51. A movable sealing member 54 is axially movably fitted in the annular gap, and a sealing ring 55 and another sealing ring 56 are fitted on around the outer surface of the fixed valve 52 and the inner wall of the female housing 51, respectively. The sealing rings 55, 56 can work with the movable sealing member 54 to achieve a radially airtight state in the male and the female coupler 4, 5. As can be seen in FIG. 4, when the receiving end 513 of the female housing 51 and the plugging end 413 of the male housing 41 are engaged with each other, the sealing ring 56 fitted on around the inner wall of the female housing 51 is in radially airtight contact with the outer wall of the male housing 41 and the plugging end 413 of the male housing 41 is axially pressed against and pushes the movable sealing member 54 in the female housing 51 toward the rear section 512. Meanwhile, the fixed valve 52 presses on and pushes the movable valve 42 to together move into the male coupler fluid passage in the male housing 41, such that the fluid passages in the male coupler 4 and the female coupler 5 are communicable with one another to open the one-way valve. The above-described prior art QDC has the following disadvantages:

(1) To fixedly fit the sealing ring 56 on around the inner wall of the female housing 51, it is necessary to pre-form a sealing ring holding groove on the inner wall of the tubular female housing. Since the tubular female housing has a limited diameter, it is uneasy to process and form the sealing ring holding groove on the inner wall of the tubular female housing and also uneasy to measure the diameter and width of the pre-formed holding groove, which further disadvantageously leads to uncontrollable product precision and quality or deviation.

(2) Due to the limited diameter of the tubular female housing 51, the sealing ring 56 can only be set in a relatively shallow holding groove. Further, the movable sealing member 54 is simply received in the annular gap pre-formed between the fixed valve 52 and the female housing 51. In the process of plugging or unplugging the male housing relative to the female housing, the sealing rings and the sealing member are easily subjected to scratching or turning under a shearing force, which results in damaged or loosened sealing rings and sealing member to cause failure or leakage in the prior art QDC structure.

(3) To relieve the problems of the prior art QDC structure possibly caused in the process of plugging or unplugging the male coupler, a normal way is to reduce the inner diameter of the sealing rings and the sealing member, so as to decrease the deformability of the sealing rings and the sealing member when they are compressed at the time the male coupler and the female coupler are connected to each other. While the above way is effective to relieve the possibility of damaged or loosened sealing rings and sealing member, the decreased interference deformation of the sealing rings and the sealing member, however, leads to synchronously decreased packing force and reduced fluid pressure resistance thereof. Frequently, the prior art QDC has obviously increased leakage rate when the pipes having an internal pressure more than 1.5 Mpa works under pressure. On the other hand, when the sealing rings have a reduced internal diameter, the diametrical size tolerance allowed for processing the sealing ring holding grooves is correspondingly reduced. Therefore, precision in mechanical processing would be strictly required to inevitably reduce the yield and increase the production cost.

SUMMARY OF THE INVENTION

To effectively solve the above problems, a primary object of the present invention is to provide a quick coupler structure, in which sealing members are fitted on around outer walls or outer surfaces of elements of the male and female coupler that are to be connected or coupled to one another, such that procedures of processing tube or hole inner walls is avoided to largely reduce the difficulty in processing or machining the quick coupler structure.

Another object of the present invention is to provide a quick coupler structure, of which sealing members are fitted in annular grooves or recesses provided on the outer walls or outer surfaces of corresponding tubes or pipes, such that the sealing members are not subjected to the problems of turning, loosening or scratching due to any axial shearing force occurred at the time the male and the female coupler are connected to or disconnected from one another.

To achieve the above and other objects, the quick coupler structure provided according to the present invention includes a male coupler, a female coupler, and a tubular sliding sleeve.

The male coupler includes a male coupler connecting section and a receiving section forming an upper and a lower part thereof, respectively. A connecting tube is axially movably received in the receiving section and a fixed valve core is set in the male coupler. The fixed valve core has an upper end internally fixed in the male coupler and a lower end extended through the connecting tube. A first sealing member is provided between a joint between the lower end of the fixed valve core and the connecting tube, and a first spring has two ends respectively pressed against the upper end of the fixed valve core and a size-reduced mouth at a lower end of the connecting tube. The connecting tube is externally formed on around a position fitted in the male coupler with at least one first annular groove for receiving at least one second sealing member therein.

The female coupler includes a coupling section and a female coupler connecting section forming an upper and a lower part thereof, respectively. The coupling section internally defines a coupling platform having a central thru-hole, and is provided on an upper wall surface with a plurality of circumferentially spaced thru-holes for receiving a steel ball each. A movable valve and a second spring are set in the female coupler. The movable valve is axially movable in and relative to the female coupler reciprocatingly to open or close the central thru-hole on the coupling platform. The second spring has an end upward pressed against one side of the movable valve for the latter to normally close the central thru-hole. When the lower end of the fixed valve core is pushed downward to move the movable valve away from the central thru-hole to open the latter, the male and the female coupler are communicable with each other. A third spring is externally fitted on around the coupling section of the female coupler. When the receiving section of the male coupler is coupled with the coupling section of the female coupler, the steel balls are radially moved inward to stop the male coupler from separating from the female coupler.

The tubular sliding sleeve has two open ends and is slidably fitted on around an outer side of the female coupler and the third spring. The third spring has an upper end pressed against a lower side of a limiting section formed on an inner wall surface of the tubular sliding sleeve and a lower end pressed against an upper end surface of the female coupler, such that the tubular sliding sleeve is kept located on around an outer side of the coupling section of the female coupler.

In the prior art, sealing rings are fitted on around the inner wall surfaces of the male and the female coupler or threaded bores provided therein. On the other hand, in the present invention, the sealing members are fitted on around the outer wall surfaces of the tubes or pipes of the male and the female coupler at positions the tubes or pipes are fitted with and slidable relative to one another. In this way, the quick coupler structure of the present invention can be more easily, simply and precisely processed than the conventional quick disconnect coupler. And, in the present invention, the sealing members are received in annular grooves formed on outer wall surfaces of the tubes or pipes of the couplers, so that the sealing members are fixedly held in the annular grooves. With these arrangements, the sealing members won't be turned, loosened or scratched due to the axial shearing force occurred when the male and the female coupler are slid relative to each other in a reciprocating motion. Therefore, the quick coupler structure of the present invention can maintain upgraded overall air-tightness.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENTS

The present invention will now be described with a preferred embodiment thereof.

Please refer to FIGS. 1A, 1B, 2A, 2B and 3. As shown, the present invention provides a quick coupler structure, which includes a male coupler 1 and a female coupler 2.

Figure 1A:
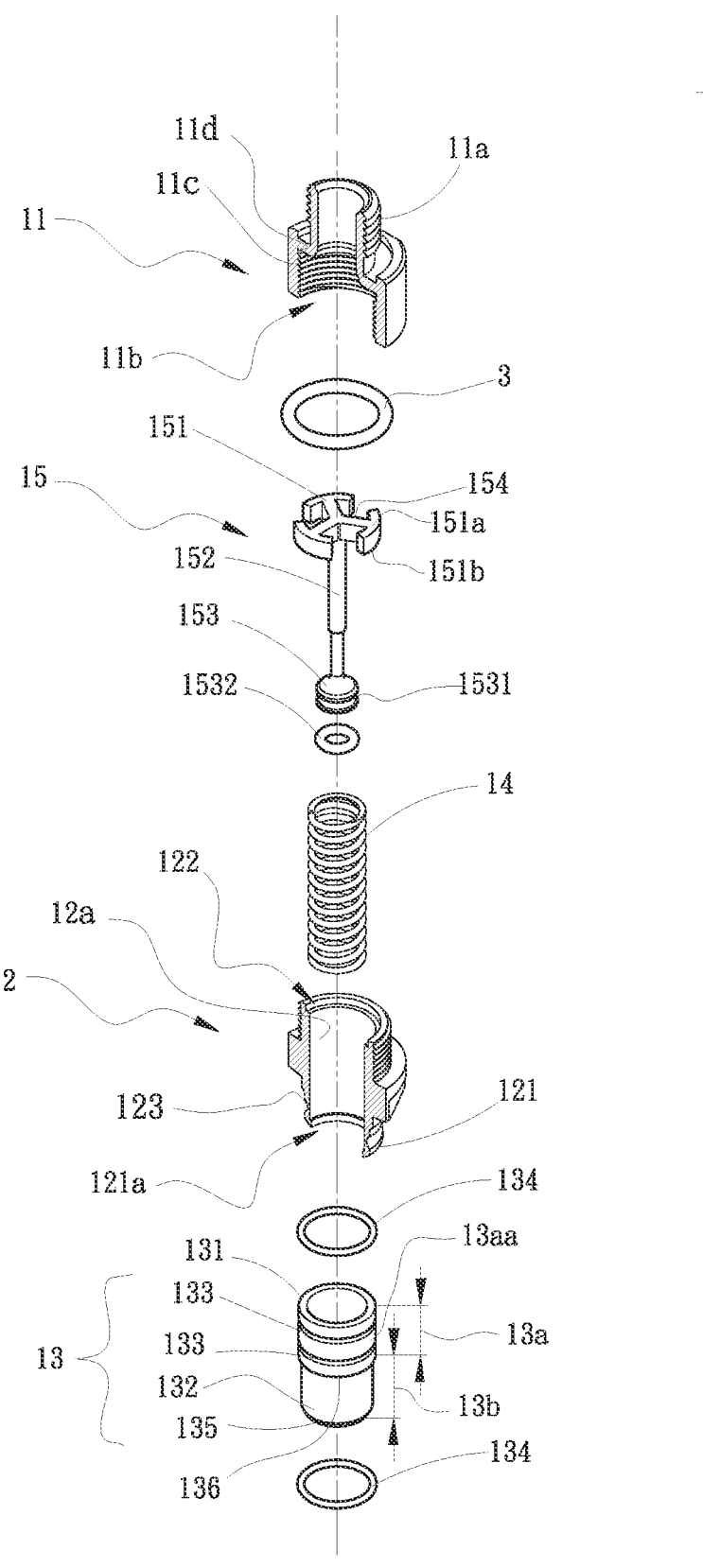
FIG. 1A is an exploded perspective view of a male coupler for the quick coupler structure according to a preferred embodiment of the present invention.
Figure 1B:
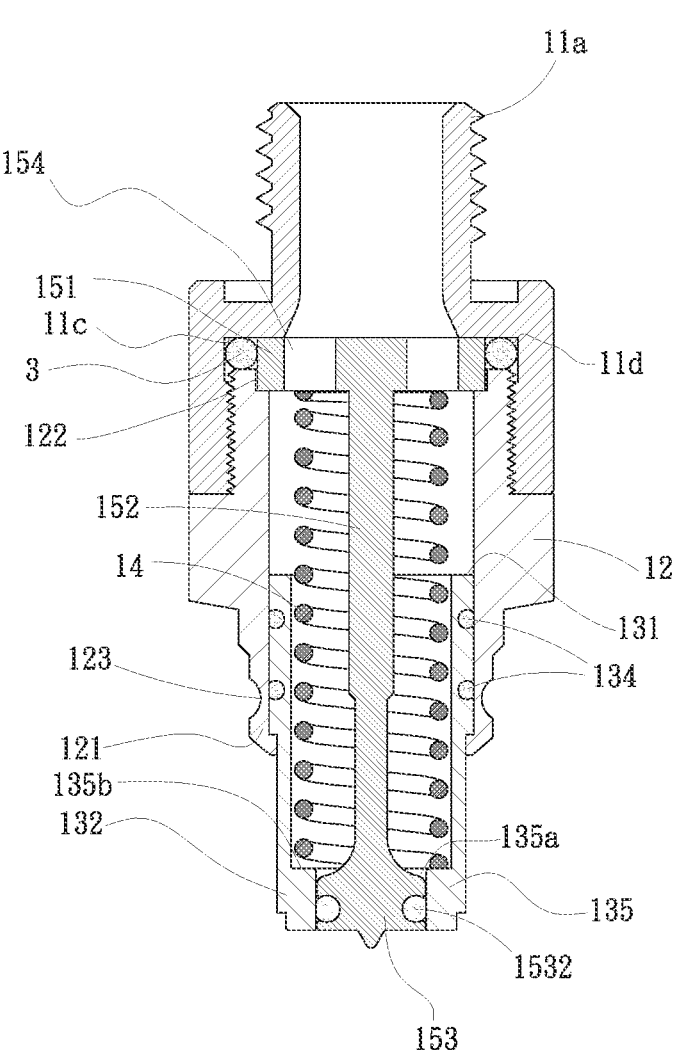
FIG. 1B is an assembled sectional view of the male coupler of FIG. 1A.

As can be seen in FIGS. 1A and 1B, the male coupler 1 includes a male coupler upper housing 11, a male coupler lower housing 12, a connecting tube 13, a first spring 14, and a fixed valve core 15.

The male coupler upper housing 11 has an upper part formed into a male coupler connecting section 11a, which is externally provided with a plurality of male threads for meshing with females threads on another gas or liquid pipe (not shown).

The male coupler upper housing 11 further has a lower part formed into a male coupler threaded bore 11b, which is internally provided with a plurality of female threads. The male coupler threaded bore 11b has an inner bottom surface 11c, and an inner annular groove 11d is formed on an inner wall surface of the male coupler threaded bore 11b adjacent to the inner bottom surface 11c.

The male coupler lower housing 12 has an upper part, which is externally provided with a plurality of male threads, and an upper end formed into a counterbore 122. The male coupler lower housing 12 further has a lower part, which is formed into a receiving section 121. The receiving section 121 has a lower end defining a diameter-reduced opening 121a, which has a diameter smaller than that of a bore defined in the receiving section 121 above the lower end. Further, the receiving section 121 has a rounded groove 123 formed around an outer surface thereof.

The male coupler upper housing 11 and the male coupler lower housing 12 are assembled to each other through engagement of the female threads in the male coupler threaded bore 11b with the male threads on the upper part of the male coupler lower housing 12.

The connecting tube 13 has an upper and a lower end, which define a connection end 131 and a plug end 132, respectively, and the connection end 131 and the plug end 132 are communicable with each other. The connecting tube 13 is divided into a first section 13*a* and a second section 13*b*. The first and the second section 13*a*, 13*b* are different in their outer diameters. More specifically, the first section 13*a* is diametrically larger than the second section 13*b*, such that a first stepped section 136 is formed at a joint between the first and the second section 13*a*, 13*b*.

The first section 13*a* of the connecting tube 13 is formed on around an outer wall surface 13*aa* with at least one first annular groove 133 for receiving a second sealing member 134 each. A lower end of the plug end 132 of the connecting tube 13 is radially inward extended toward a centerline of the connecting tube 13 to form a first size-reduced mouth 135, which defines a first thru-hole 135*a*.

The connection end 131 of the connecting tube 13 is correspondingly inserted through the diameter-reduced opening 121*a* into the receiving section 121 of the male coupler lower housing 12, such that the outer wall surface 13*aa* of the first section 13*a* of the connecting tube 13 fitted in the male coupler lower housing 12 is slidable relative to an inner wall surface 12*a* of the male coupler lower housing 12. That is, the connecting tube 13 can retract into or extend out of the male coupler lower housing 12 in a reciprocating motion.

The first section 13*a* of the connecting tube 13 has an outer diameter smaller than an inner diameter of the male coupler lower housing 12, so that the first section 13*a* of the connecting tube 13 is loosely fitted in the male coupler lower housing 12 and can move relative to the male coupler lower housing 12 reciprocatingly. To ensure an airtight state is always kept between the first section 13*a* and the male coupler lower housing 12 when the first section 13*a* is axially moved relative to the male coupler lower housing 12 reciprocatingly, the second sealing member 134 in the first annular groove 133 on the first section 13*a* is configured to fill up or seal any radial gap between the first section 13*a* and the male coupler lower housing 12.

On the other hand, the first section 13*a* of the connecting tube 13 has an outer diameter larger than an inner diameter of the diameter-reduced opening 121*a* of the receiving section 121 of the male coupler lower housing 12, and the second section 13*b* of the connecting tube 13 has an outer diameter smaller than the inner diameter of the diameter-reduced opening 121*a*. With these arrangements, the first stepped section 136 on the connecting tube 13 would be stopped from moving down any further at the diameter-reduced opening 121*a* to separate from the male coupler lower housing 12 when the first and the second section 13*a*, 13*b* of the connecting tube 13 are sliding relative to the male coupler lower housing 12.

As can be seen in FIGS. 1A and 1B, the fixed valve core 15 includes a valve core base 151, a valve core stem 152, and a valve core head 153. The valve core base 151 includes a top side 151*a* and a bottom side 151*b*.

The valve core base 151 and the valve core head 153 are respectively connected to one of two ends of the valve core stem 152. The valve core head 153 has a diameter larger than that of the valve core stem 152 but smaller than an inner diameter of the first thru-hole 135*a*. Further, the valve core head 153 is provided on around a radially outer surface with at least one annular groove 1531, which has a first sealing member 1532 fitted therein.

The first spring 14 is fitted on around the valve core stem 152. The valve core stem 152 with the first spring 14 fitted thereon is extended into the male coupler lower housing 12 from the upper inner end thereof, such that the bottom side 151*b* of the valve core base 151 is abutted on a bottom of the counterbore 122 on the male coupler lower housing 12.

A sealing member 3 is fitted in the inner annular groove 11*d* in the male coupler threaded bore 11*b* of the male coupler upper housing 11. When the male coupler upper housing 11 and the male coupler lower housing 12 are screwed together, the top side 151*a* of the valve core base 151 of the fixed valve core 15 is pressed against the inner bottom surface 11*c* of the male coupler threaded bore 11*b* and the bottom side 151*b* of the valve core base 151 is abutted on a bottom of the counterbore 122 on the male coupler lower housing 12, such that the valve core base 151 is clamped between the male coupler upper housing 11 and the male coupler lower housing 12. With these arrangements, the fixed valve core 15 is held in place between the assembled male coupler upper and lower housings 11, 12, and the sealing member 3 ensures an airtight state between the male coupler upper and lower housings 11, 12.

An inner wall surface of the first thru-hole 135*a* on the connecting tube 13 reciprocatingly slides relative to an outer side of the valve core head 153 frequently to open or close the male coupler 1. That is, the valve core head 153 is not tightly fitted in the first thru-hole 135*a*. When the male coupler 1 is in a normally closed state, there is still a micro-gap existed between the valve core head 153 and the first thru-hole 135*a*. The first sealing member 1532 serves to fill up any micro-gap between the valve core head 153 and the first thru-hole 135*a* to ensure the air-tightness of the male coupler 1 in the normally closed state.

The valve core base 151 is provided with a plurality of circumferentially equally or non-equally spaced cuts 154, which serve as passages for gas or liquid to flow therethrough.

When the male coupler 1 is in an assembled state as shown in FIG. 1B, both the fixed valve core 15 and the first spring 14 are received in the male coupler 1 with the first spring 14 being fitted around the valve core stem 152 of the fixed valve core 15. The first spring 14 has an end pressed against the bottom side 151*b* of the valve core base 151 and another end pressed against an inner surface 135*b* of the first diameter-reduced opening 135 of the connecting tube 13 located adjacent to the first thru-hole 135*a*.

Figure 2A:
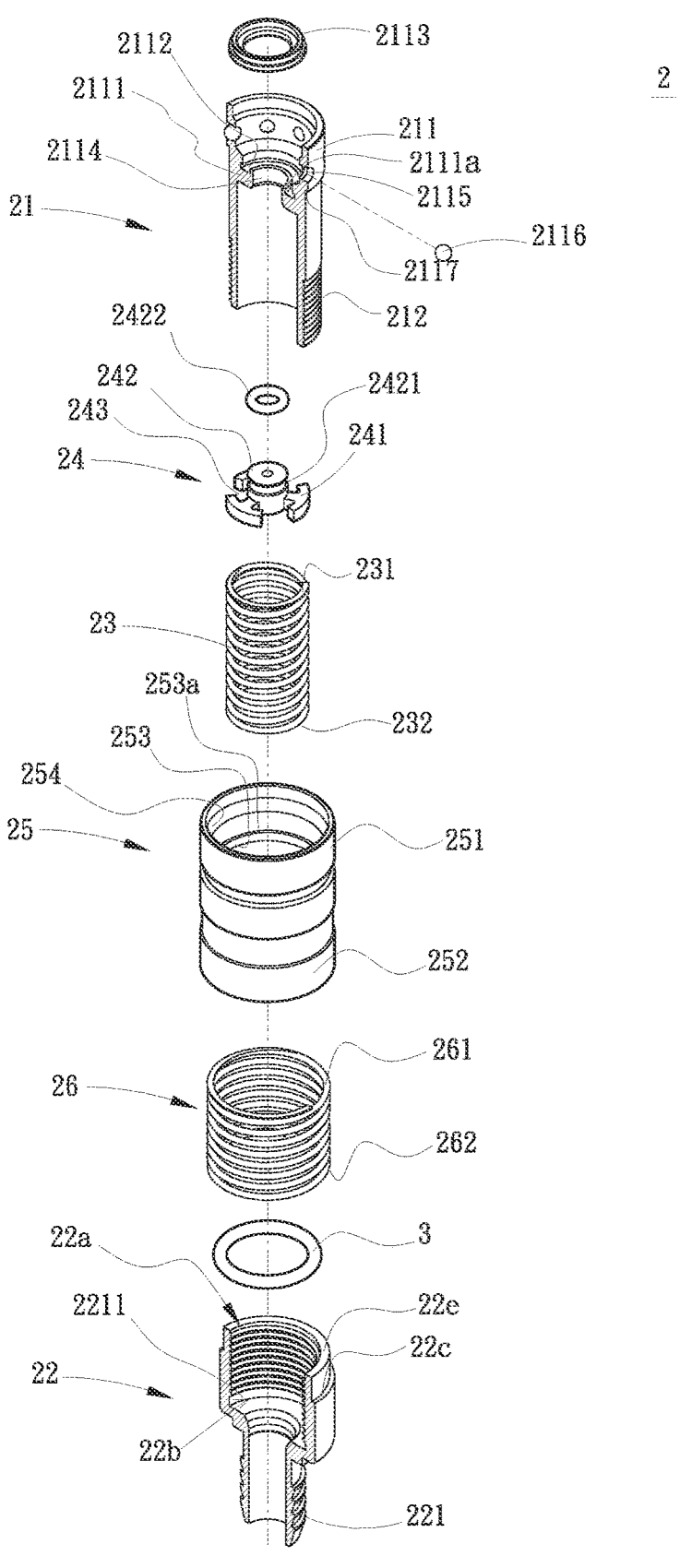
FIG. 2A is an exploded perspective view of a female coupler for the quick coupler structure according to the preferred embodiment of the present invention.
Figure 2B:
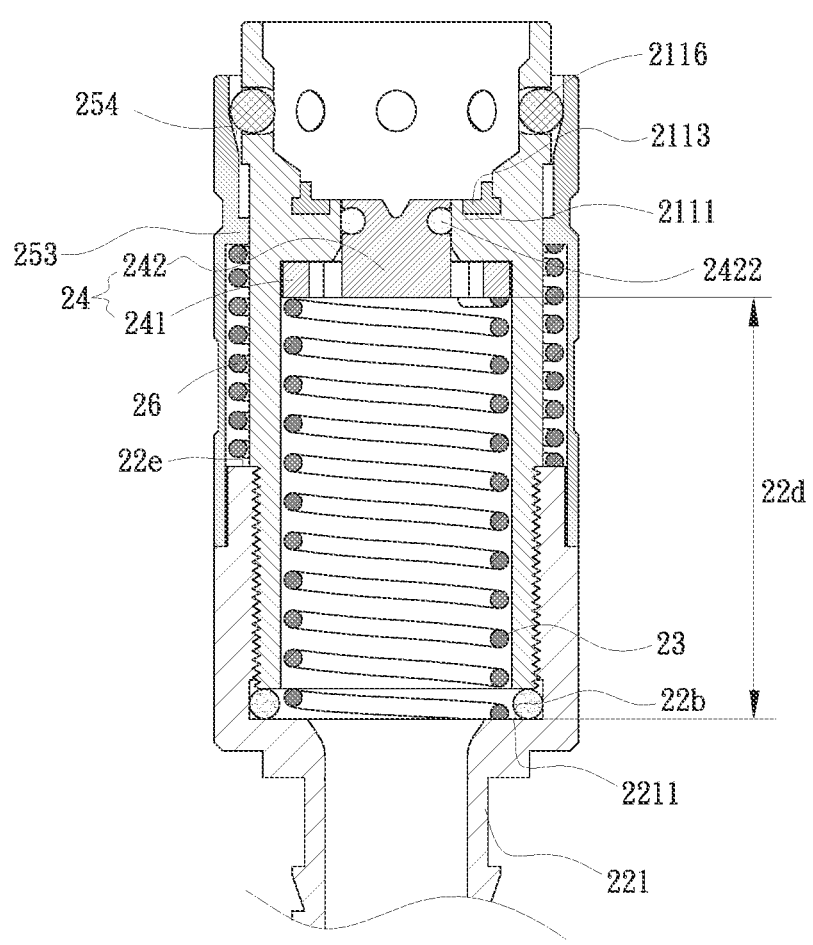
FIG. 2B is an assembled sectional view of the female coupler of FIG. 2A.

Please refer to FIGS. 2A and 2B. The female coupler 2 includes a female coupler upper housing 21, a female coupler lower housing 22, a second spring 23, a movable valve core 24, and a tubular sliding sleeve 25.

The female coupler upper housing 21 has an upper part serving as a coupling section 211 and a lower part serving as a screwing section 212 and being externally provided with a plurality of male threads. The coupling section 211 of the female coupler upper housing 21 has an inner wall surface, which is radially inward extended toward a centerline of the female coupler upper housing 21 to provide a coupling platform 2111. An upward end surface 2111*a* of the coupling platform 2111 is formed with a sealing member receiving recess 2112 for receiving a third sealing member 2113 therein. The coupling platform 2111 defines a central thru-hole 2114 that axially extends through the coupling platform 2111.

The coupling section 211 of the female coupler upper housing 21 is circumferentially provided on its wall with a plurality of thru-holes 2115, each of which has a steel ball 2116 set therein. The steel balls 2116 are radially inward or outward movable in the thru-holes 2115 relative to the female couple upper housing 21. Further, the coupling section 211 of the female coupling upper housing 21 has an outer diameter larger than that of the screwing section 212, such that a second stepped section 2117 is formed at a joint between the coupling section 211 and the screwing section 212.

The female coupler lower housing 22 has a lower part serving as a female coupler connecting section 221, which has a plurality of male threads provided on an outer surface thereof. The female coupler lower housing 22 further has an upper part formed into a female coupler threaded bore 22a having a plurality of female threads formed on an inner wall surface thereof. The female coupler threaded bore 22a is formed around an inner bottom with a shoulder portion 22b, and a length of the inner wall surface of the female coupler threaded bore 22a located adjacent to the shoulder portion 22b is smooth without providing any female thread to thereby form an annular recess 2211 for receiving a further sealing member 3 therein. Further, a third stepped section 22c is externally formed around the upper part of the female coupler lower housing 22 at a location about one-third of its full length down from an upper end thereof.

The female coupler upper housing 21 and the female coupler lower housing 22 are assembled to each other through engagement of the male threads on the screwing section 212 of the female coupler upper housing 21 with the female threads in the female coupler threaded bore 22a of the female coupler lower housing 22. The further sealing member 3 ensures an airtight state between the female coupler upper and lower housings 21, 22. After the female coupler upper housing 21 and the female coupler lower housing 22 are assembled to each other, a valve traveling space 22d is defined between the coupling platform 2111 and the shoulder portion 22b.

The movable valve 24 includes a valve base 241 and a valve head 242. The valve base 241 has a top side, which is extended upward to form the valve head 242. The valve base 241 is circumferentially provided with a plurality of equally or non-equally spaced cuts 243, which serve as passages for gas or liquid to flow therethrough.

The valve head 242 has an outer diameter smaller than that of the valve base 241. The outer diameter of the valve head 242 is also smaller than an inner diameter of the central thru-hole 2114, such that the valve head 242 is slidably fitted in the central thru-hole 2114 and movable relative to the central thru-hole 2114 to correspondingly open or close the central thru-hole 2114. To ensure an airtight state between the valve head 242 and the central thru-hole 2114, the valve head 242 is further provided on its circumferential outer surface with at least one groove 2421 for receiving a fourth sealing member 2422 each. The fourth sealing member 2422 fills up any micro-gap between the valve head 242 and the central thru-hole 2114 of the coupling platform 2111 to achieve an airtight effect.

The second spring 23 has an upper end 231 and a lower end 232. Both the second spring 23 and the movable valve 24 are received in the valve traveling space 22d with the upper end 231 of the second spring 23 pressed against one side of the valve base 241 opposite to the valve head 242 and the lower end 232 of the second spring 23 pressed against the shoulder portion 22b, such that the movable valve 24 is pushed upward by the second spring 23 to normally close the central thru-hole 2114 of the coupling platform 2111.

The tubular sliding sleeve 25 includes an upper section 251 and a lower section 252, and a limiting section 253 provided on an inner wall surface of the tubular sliding sleeve 25 corresponding to a location between the upper section 251 and the lower section 252. The upper section 251 of the tubular sliding sleeve 25 has an inner wall surface that is tapered downward to form a conical surface 254.

A third spring 26 is fitted on around the female coupler upper housing 21 and the lower section 252 of the tubular sliding sleeve 25 is externally fitted around the third spring 26. The third spring 26 has an upper end 261 pressed against a lower side surface of the limiting section 253 of the tubular sliding sleeve 25 and a lower end 263 pressed against an upper end surface 22e of the female coupler lower housing 22. The limiting section 253 of the tubular sliding sleeve 25 has an upper side surface 253a abutted against the second stepped section 2117 on the female coupler upper housing 21, such that the tubular sliding sleeve 25 is prevented from moving out of an outer side of the female coupler upper housing 21 when the tubular sliding sleeve 25 is axially moved upward along and relative to the outer side of the female coupler upper housing 21. On the other hand, when the tubular sliding sleeve 25 is moved downward, a lower-most edge of a lower end of the tubular sliding sleeve 25 is stopped by the third stepped section 22c from moving downward any further to separate from the female coupler lower housing 22.

The third spring 26 upward pressed against the limiting section 253 of the tubular sliding sleeve 25 pushes the latter upward. At this point, the steel balls 2116 set in the thru-holes 2115 on the coupling section 211 of the female coupler upper housing 21 are pushed by the conical surface 254 of the upper section 251 of the tubular sliding sleeve 25 to move radially inward toward an interior of the female coupler upper housing 21. Since the third spring 26 keeps the tubular sliding sleeve 25 in the upward pushed position, the steel balls 2116 are continuously held to the radially inward moved position by the conical surface 254 of the tubular sliding sleeve 25.

To quickly connect the male coupler 1 to the female coupler 2, in a first step, the tubular sliding sleeve 25 outside the female coupler upper housing 21 is axially pulled downward, such that the conical surface 254 of the tubular sliding sleeve 25 no longer holds the steel balls 2116 to the radially inward position. Then, align and press a front end of the plug section 132 of the connecting tube 13 of the male coupler 1 against the third sealing member 2113 fitted on the coupling platform 2111 of the female coupler 2 for the third sealing member 2113 to provide a preliminary airtight state between the male and the female coupler 1, 2. Meanwhile, the valve core head 153 of the fixed valve core 15 is also abutted on and engaged with the valve head 242 of the movable valve 24.

Then, an external force is applied to the male coupler 1 for the same to move toward the female coupler 2. When the male coupler 1 is moving toward the female coupler 2, the connecting tube 13 is subjected to an axial push force and the first spring 14 is also elastically compressed under the axial push force, which brings the connecting tube 13 to retract into the male coupler lower housing 12 in a direction opposite to that of the axial push force. At this point, the receiving section 121 of the male coupler lower housing 12 is correspondingly extended into the coupling section 211 of the female coupler upper housing 21 and the steel balls 2116 provided on the coupling section 211 are correspondingly moved into the rounded groove 123 formed on the outer surface of the receiving section 121 to thereby hold the male and the female coupler 1, 2 to each other. Then, the tubular sliding sleeve 25 is released, the third spring 26, the upper end of which is pressed against the lower side of the limiting section 253 of the tubular sliding sleeve 25, pushes the tubular sliding sleeve 25 upward until the latter returns to its original position. At this point, the steel balls 2116 are pushed by the conical surface 254 of the tubular sliding sleeve 25 to the radially inward moved position to hold the male and the female coupler 1, 2 to each other, ensuring the male and the female coupler 1, 2 won't loosen or even separate from each other owing to high pressure of the gas or liquid being transferred through the quick coupler structure of the present invention.

Figure 3:
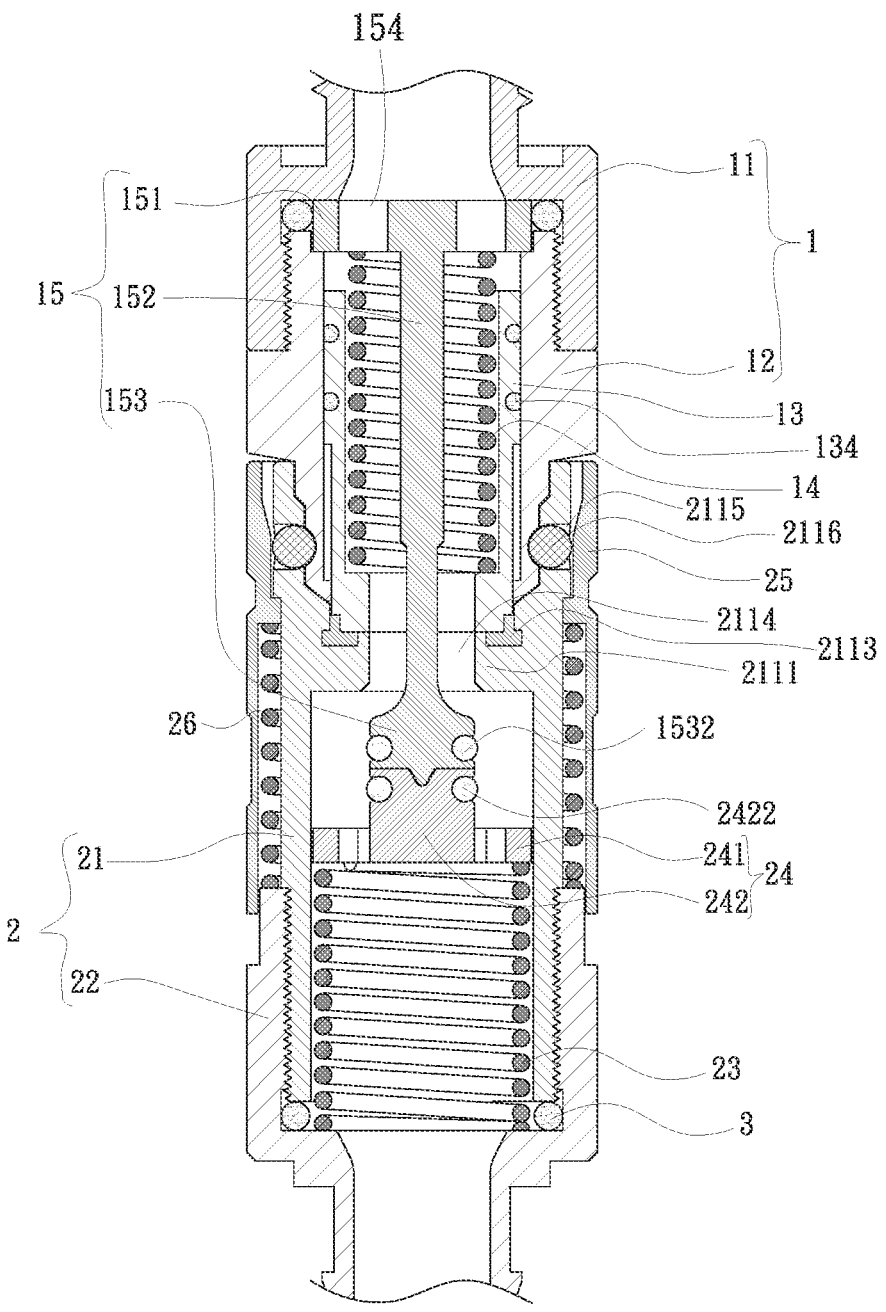
FIG. 3 is an assembled sectional view of the quick coupler structure according to the preferred embodiment of the present invention.

Please refer to FIG. 3 along with FIGS. 1A through 2B. When the housings of the male and the female coupler 1, 2 are connected together and the connecting tube 13 is retracted into the male coupler 1, the valve core head 153 of the fixed valve core 15 fitted in the male coupler 1 is gradually exposed from the first thru-hole 135a to be located closer and closer to and finally press against the valve head 242 of the movable valve 24. At this point, the second spring 23, the upper end 231 of which is pressed against a lower side of the valve base 241, is also elastically compressed by the gradually approaching valve core head 153. Finally, the movable valve 24 is moved out of the central thru-hole 2114 of the coupling platform 2111, such that the central thru-hole 2114 is in an unblocked state to allow gas or liquid to freely flow through the central thru-hole 2114. At this point, the coupling of the male and the female coupler 1, 2 is completed.

Figure 4:
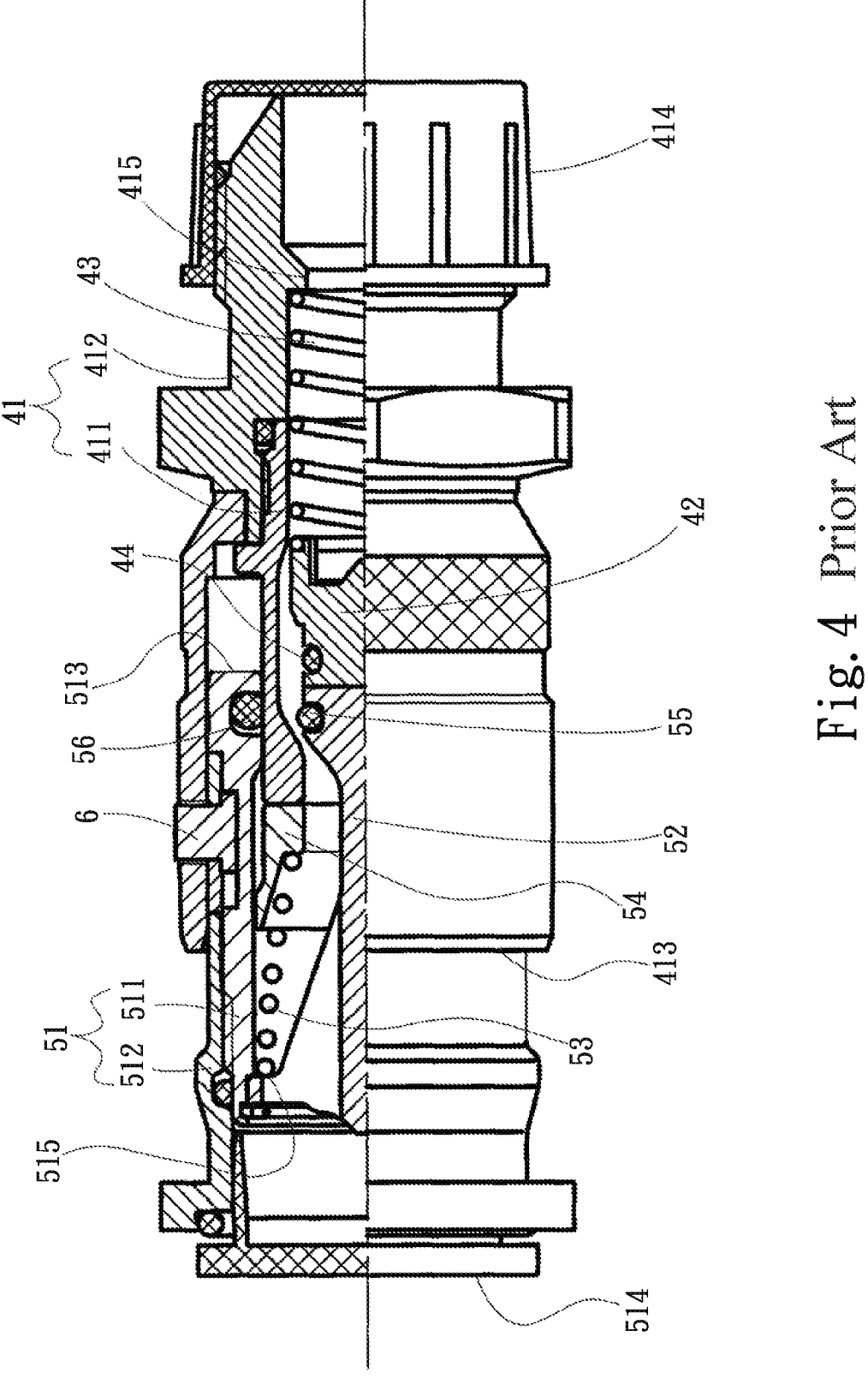
FIG. 4 is a cutaway view of a prior art quick disconnect coupler.

In the prior art as shown in FIG. 4, the mounting of the sealing rings on inner pipe surfaces or threaded bores in the quick disconnect coupler (QDC) is uneasy; and a shearing force occurred axially when the male and the female coupler are assembled to or disassembled from each other would rotate, loosen or scratch the sealing rings. On the other hand, in the present invention, the annular grooves or recesses for receiving the sealing members are provided at locations on the outer wall surfaces where the male and the female coupler are slidably fitted relative to each other, which enables more convenient, simpler, and more precise mounting and processing of the coupler housings, compared to the prior art. In the present invention, the annular grooves or recesses provided on the outer wall surfaces of the male and the female coupler housings can receive and hold the sealing members in place, such that the sealing members won't be turned or removed from their original positions due to a shearing force occurred when the components of the male and the female couplers are coupled and slid relative to each other. Thus, with the present invention, the disadvantages in the prior art can be eliminated.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A quick coupler structure comprising:

a male coupler including a male coupler upper housing, a male coupler lower housing, a connecting tube with a connection end and an opposite plug end each with a different outer diameter than the other, the connecting tube further having a first stepped section formed intermediate the connection end and the plug end of the connecting tube, a second sealing member, and a fixed valve core having a first spring fitted therearound and having an end fixed to an inner side of the male coupler and another end extended into the connecting tube; the male coupler upper housing being assembled to the male coupler lower housing, the connecting tube being slidably fitted in a lower end of the male coupler lower housing so as to be able to reciprocate in an axial direction therewith and being provided at the connection end and on an outer surface with at least a first annular groove with the second sealing member fitted in the first annular groove so as to provide radial sealing between the connecting tube and the male coupler lower housing during reciprocating motion of the connecting tube, and wherein the plug end of the connecting tube is retractable into and extendable outward from the male coupler lower housing in reciprocating motion, wherein the first stepped section is configured to engage with an interior shoulder of the male coupler lower housing to inhibit the connecting tube from detaching during the reciprocating motion; and a female coupler having a female coupler upper housing, a female coupler lower housing, and a tubular sliding sleeve; the female coupler upper housing and the female coupler lower housing being assembled to define in between them a valve traveling space; a third spring being externally fitted around the female coupler upper housing, and the tubular sliding sleeve being slidably fitted around an outer side of the female coupler upper housing and the third spring; the female coupler upper housing internally defining a coupling platform provided with a central thru-hole and a sealing member receiving recess for receiving a third sealing member therein; and a movable valve and a second spring being movably fitted in the valve traveling space, and the second spring having an upper end pushing the movable valve upward to close the central thru-hole of the coupling platform; and wherein when the male and the female couplers are connected to each other, the connecting tube can be retracted into the male coupler, such that the end of the fixed valve core extended into the connecting tube is exposed from the connecting tube to engage with and push against the movable valve, causing the movable valve to move in a direction opposite to the coupling platform to open the central thru-hole of the coupling platform, so that the assembled male and female couplers internally provide an unblocked passage for a fluid being transferred to flow therethrough freely, wherein the second sealing member and the first stepped section are cooperatively configured to ensure dynamic radial sealing and inhibit detachment of the connecting tube during reciprocating motion, thereby achieving structural and sealing stability under high-pressure conditions, wherein the movable valve includes a valve base and a valve head; the valve base being upward extended from a top side to form the valve head and having a plurality of circumferentially equally or non-equally spaced cuts; and the valve head being provided on its circumferential outer surface with at least one groove for receiving a fourth sealing member each.

2. The quick coupler structure as claimed in claim 1, wherein the male coupler includes a male coupler connecting section and a receiving section; the male coupler connecting section being located at an upper part of the male coupler upper housing and the receiving section being located at a lower part of the male coupler lower housing; the male coupler upper housing being externally provided on the upper part with a plurality of male threads and internally provided on a lower part with a plurality of female threads, and the male coupler lower housing being externally provided on an upper part thereof with a plurality of male threads; and the male coupler upper housing and the male coupler lower housing being assembled to each other through engagement of the female threads on the male coupler upper housing with the male threads on the male coupler lower housing.

3. The quick coupler structure as claimed in claim 2, wherein the connection end of the connecting tube is received in the receiving section of the male coupler lower housing and is axially movable relative to the receiving section, and wherein the plug end has a lower end formed into a first size-reduced mouth that defines a first thru-hole.

4. The quick coupler structure as claimed in claim 3, wherein the fixed valve core includes a valve core base, a valve core stem extended from a lower side of the valve core base, and a valve core head located at a lower end of the valve core stem; the valve core head being provided on around a radially outer surface with at least one first annular groove, which has a first sealing member fitted therein; and the first spring having an upper end pressed against the fixed valve core and a lower end pressed against the first size-reduced mouth of the connecting tube.

5. The quick coupler structure as claimed in claim 1, wherein the female coupler lower housing has a lower part formed into a female coupler connecting section, which is externally provided with a plurality of male threads, and the female coupler upper housing has an upper part formed into a coupling section and a lower part formed into a screwing section, which is externally provided with a plurality of male threads.

6. The quick coupler structure as claimed in claim 1, wherein the third spring is fitted on around the outer side of the female coupler upper housing, and the tubular sliding sleeve has a lower part that is located outside the third spring; the third spring having an upper end pressed against a lower side surface of a limiting section provided on an inner wall surface of the tubular sliding sleeve and a lower end pressed against an upper end surface of the female coupler lower housing; and the limiting section having an upper side surface selectively abutted against a second stepped section externally formed on the female coupler upper housing, such that the tubular sliding sleeve is prevented from moving out of the outer side of the female coupler upper housing when the tubular sliding sleeve is axially moved upward or downward along and relative to the outer side of the female coupler upper housing in a reciprocating motion.

7. The quick coupler structure as claimed in claim 1, wherein the tubular sliding sleeve has two open ends and includes an upper section and a lower section; a limiting section being provided on around an inner wall surface of the tubular sliding sleeve corresponding to a location between the upper and the lower sections; the upper section of the tubular sliding sleeve having an inner wall surface that is tapered downward to form a conical surface; and the third spring having an upper end pressed against the limiting section of the tubular sliding sleeve and a lower end pressed against an upper end surface of the female coupler lower housing.

8. The quick coupler structure as claimed in claim 1, wherein the female coupler has an upper end and a lower end formed into a coupling section and a female coupler connecting section, respectively; the coupling section being circumferentially provided with a plurality of spaced thru-holes, each of which has a steel ball set therein; the female coupler connecting section having an inner bottom formed into a shoulder portion and the movable valve being located between a bottom side of the coupling platform and the shoulder portion; the second spring having the upper end upward pressed against the movable valve and a lower end downward pressed against the shoulder portion, such that the movable valve seals the central thru-hole of the coupling platform.

9. The quick coupler structure as claimed in claim 1, wherein the interior shoulder is formed by a reduced-diameter hole of the male coupler lower housing and is configured to abut against the first stepped section of the connecting tube so as to restrict axial displacement of the connecting tube.

\* \* \* \* \*